United States Patent [19]

Tuck

[11] Patent Number: 4,772,942

[45] Date of Patent: Sep. 20, 1988

[54] DISPLAY SYSTEM HAVING WIDE FIELD OF VIEW

[75] Inventor: Michael J. Tuck, Denbigh, Wales

[73] Assignee: Pilkington P.E. Limited, St. Helens, England

[21] Appl. No.: 1,203

[22] Filed: Jan. 7, 1987

[30] Foreign Application Priority Data

Jan. 11, 1986 [GB] United Kingdom ............... 8600635

[51] Int. Cl.[4] .............................................. H04N 7/18
[52] U.S. Cl. ...................................... 358/87; 358/108; 315/371
[58] Field of Search ...................... 358/87, 108, 88, 89, 358/91, 92, 242, 225; 315/371; 314/521, 522

[56] References Cited

U.S. PATENT DOCUMENTS

| | | | |
|---|---|---|---|
| 3,432,219 | 3/1969 | Shenker et al. | 358/87 X |
| 3,504,122 | 3/1970 | Ratliff, Jr. | 358/88 |
| 3,723,805 | 3/1973 | Scarpino et al. | 315/27 |
| 3,833,764 | 9/1974 | Taylor | 358/87 |
| 3,872,238 | 3/1975 | Herndon | 358/87 |
| 4,152,724 | 5/1979 | Hunter | 358/87 X |
| 4,183,624 | 1/1980 | Rogers et al. | 350/410 |
| 4,210,929 | 7/1980 | Takabayashi | 358/64 |
| 4,274,110 | 6/1981 | Lehnert | 358/60 |
| 4,355,328 | 10/1982 | Kulik | 358/87 |
| 4,518,898 | 5/1985 | Tarnowski et al. | 315/371 |
| 4,537,483 | 8/1985 | Turner | 353/39 |
| 4,549,208 | 10/1985 | Kamejima et al. | 358/88 X |

FOREIGN PATENT DOCUMENTS

| | | |
|---|---|---|
| 151455 | 1/1985 | European Pat. Off. |
| 507582 | 12/1937 | United Kingdom |
| 1362477 | 3/1972 | United Kingdom |
| 1378019 | 8/1972 | United Kingdom |
| 1455290 | 12/1973 | United Kingdom |
| 2013456 | 8/1978 | United Kingdom |
| 2102234 | 7/1981 | United Kingdom |
| 2159295 | 4/1985 | United Kingdom |

*Primary Examiner*—Howard W. Britton
*Assistant Examiner*—Victor R. Kostak
*Attorney, Agent, or Firm*—F. Eugene Davis, IV

[57] ABSTRACT

A display system which can be used inside a vehicle such as a military tank to monitor at least part of the surrounding panorama. The display system has a display generator and an optical system for viewing the display. Electronic means are provided to predistort the display to compensate for distortion present in the optical system. The system includes individual display units mounted side-by-side, each having a respective television camera associated therewith so that a substantially continuous picture of at least part of the surrounding panorama can be reconstructed and viewed by an observer without any apparent mismatch between adjacent displays.

8 Claims, 3 Drawing Sheets

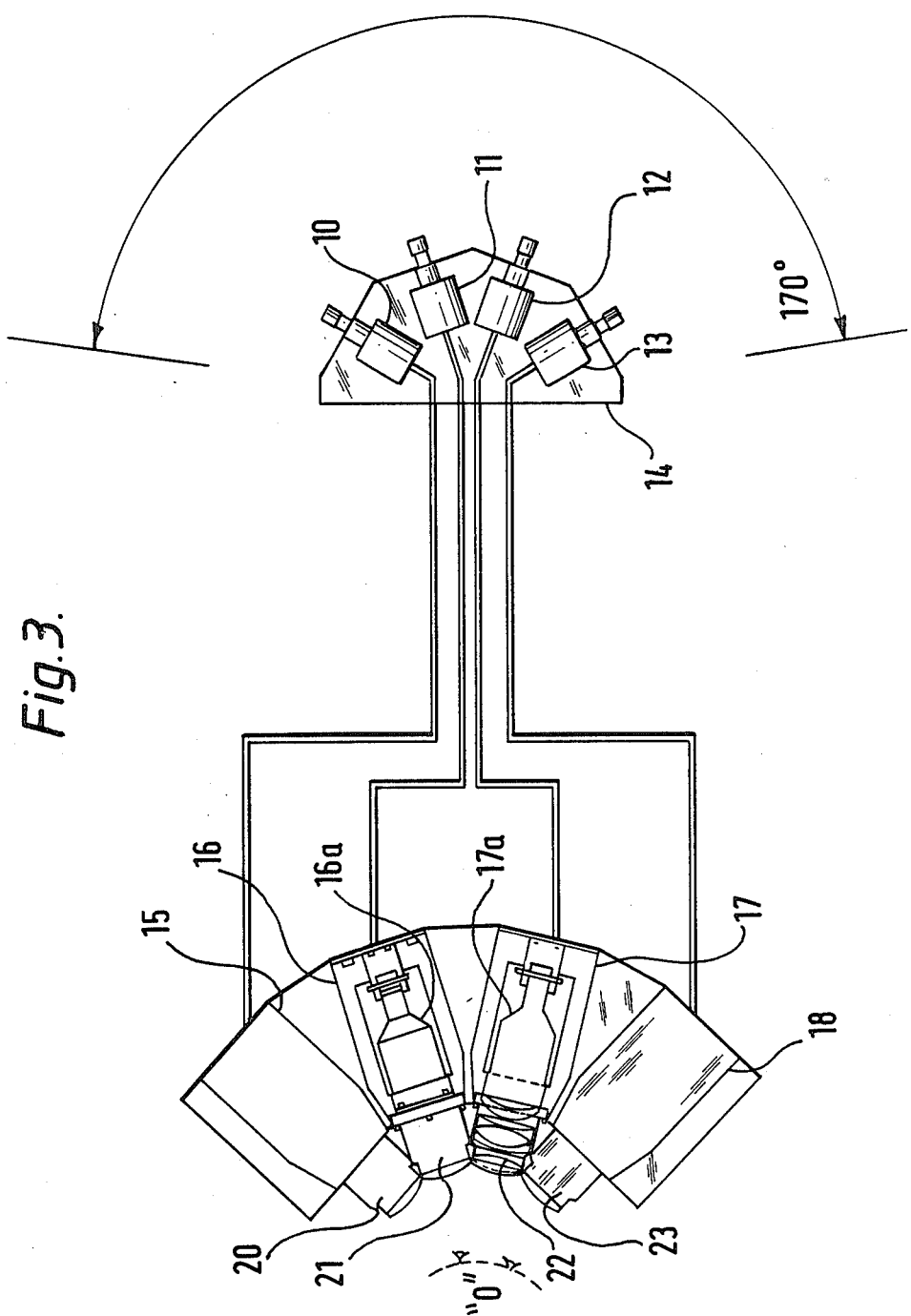

DISPLAY SYSTEM HAVING WIDE FIELD OF VIEW

BACKGROUND OF THE INVENTION

This invention relates to a display system which can be used, for example, inside a vehicle such as a tank in order to monitor at least part of the surrounding field of view.

In modern display systems the display generator is typically a cathode ray tube (CRT) which is designed to present minimal distortion to a viewer of the display. However, in some instances, the display generator forms part of a larger display system which utilises an optical system to view the generated display, typically under magnification. In such circumstances, there is a problem in that even a well designed optical system introduces distortion not originally present in the CRT. This is particularly true of biocular magnifiers (corresponding to U.S. Pat. No. 4,183,624), such as those exemplified in UK patent specification No. 1537276. A typical biocular magnifier introduces distortion which increases towards the edge of the CRT such that an observer, instead of seeing a perfectly rectangular view, instead perceives a view having "pin cushion" distortion, or in some cases, "barrel" distortion.

Such distortion can be overcome to some extent by designing into the optical system compensating elements but this usually increases the cost and complexity of the system as a whole and is not alway satisfactory, particularly where there are constraints on the size of the system, e.g. when installed within a military vehicle such as a tank. An example of this type of correction is shown in UK patent application No. 2159295A (corresponding to U.S. application Ser. No. 4,537,483), in which barrel distortion introduced by a biocular magnifier in a microscope viewing system is corrected by means of an optical element shaped to provide optical distortion in an opposite sense to that of the biocular such that an observer is able to view a substantially undistorted image.

It is an object of the first aspect of the invention to provide a display system in which the need for optical correction of distortion, as defined above, is obviated.

SUMMARY OF THE INVENTION

According to a first aspect of the invention, there is provided a display system including a display generator and a respective optical system for viewing the generated display, and means to pre-distort the generated display to compensate for distortion introduced by the optical system to thereby provide a substantially undistorted view of the display.

The invention thus provides a system which obviates the need to design into an optical system, for use with a display generator, optical correction of distortion.

By "display generator" is meant means to construct a required display and, conveniently, the display generator is a CRT and the optical system may suitably comprise a biocular magnifying lens. The means to pre-distort the generated display in a manner which compensates for distortion or other aberration present in the optical system may be by way of electronic control of the drive signal supplied to the display generator which distorts the generated display in a sense opposite to the distortion present in the optical system. By providing a display system capable of generating an undistorted rectangular view, according to the first aspect of the invention, it is therefore possible to interlink adjacent displays without substantial "barrel" or "pin-cushion" distortion at the edges thereof which would otherwise create a mismatch therebetween.

Accordingly, in a second aspect of the invention there is provided a display system comprising one or an array of moving picture cameras adapted alone or in combination to cover a wide field of view, the or each camera having a respective display generator or generators upon which a respective part of the field of view can be displayed, an optical system arranged to afford an apparent significant overlap of adjacent displayed parts of the fields of view, and means to pre-distort adjacent displays to thereby reconstruct the original wide field of view such that an observer is substantially unable to discern any mismatch between adjacent displays at close range, even with at least some head movement.

The term "moving picture cameras" in this context is intended to include television, video, thermal and low light level cameras.

As with the first aspect of the invention the display generator is conveniently a cathode ray tube (CRT), the optical system includes biocular magnifying lenses and the means to pre-distort the generated display includes electronic control means adapted to compensate for distortion or other aberration present in the optical system such that a substantially undistorted view is obtained over the whole of the field of view. In the second aspect of the invention, the apparent overlaps between adjacent displays being relatively large permit head movement of the observer and in appropriate circumstances, i.e. when there is a sufficiently large overlap of, say, 20°, a certain amount of stereoscopy is possible.

The display system according to the second aspect of the invention may be arranged such that each respective display generator and biocular magnifier is designed as a modular display unit so that any number of modular display units can be utilised as desired, usually positioned side-by-side in an arcuate configuration so as to retain the same relative distance with the observer. Thus, if four modular display units were utilised, each having a 50° field of view, then if a 10° overlap is provided, in combination the modular display units would display a field of view of approximately 170°.

BRIEF DESCRIPTION OF THE DRAWINGS

The invention will now be described by way of example only, with reference to the accompanying drawings in which:

FIG. 3. is a schematic view of a system according to the second aspect of the invention.

DETAILED DESCRIPTION OF THE INVENTION

Figure 1:
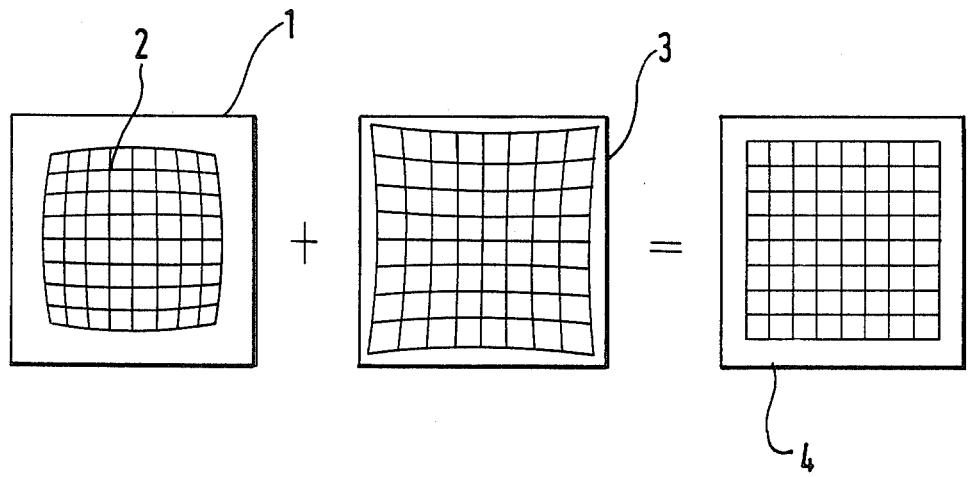
FIG. 1. Is a schematic view of part of the display system according to the first aspect of the invention outlining the broad principle of operation, FIG. 2. is a circuit diagram for use with the system of FIG. 1.

Referring firstly to FIG. 1 the broad principle of operation of the display system is outlined in which a display generator in the form of a cathode ray tube 1 is shown as having a generated display in the form of a grid pattern 2 which has been electronically manipulated, in a manner to be described, to provide barrel distortion of the grid.

An optical system in the form of a biocular magnifying lens 3 is shown, for clarity of illustration only, adjacent the CRT 1 and would normally be placed over the display 2. The biocular magnifier 3, in this example, optically "pin-cushion" distorts the image of the grid 2.

As a consequence of the combination of the distortion introduced by the biocular magnifying lens 3 and that provided in opposite sense by the CRT, the display system presents a display 4 which is substantially rectangular and undistorted and corresponds to the view that an observer would see.

Figure 2:
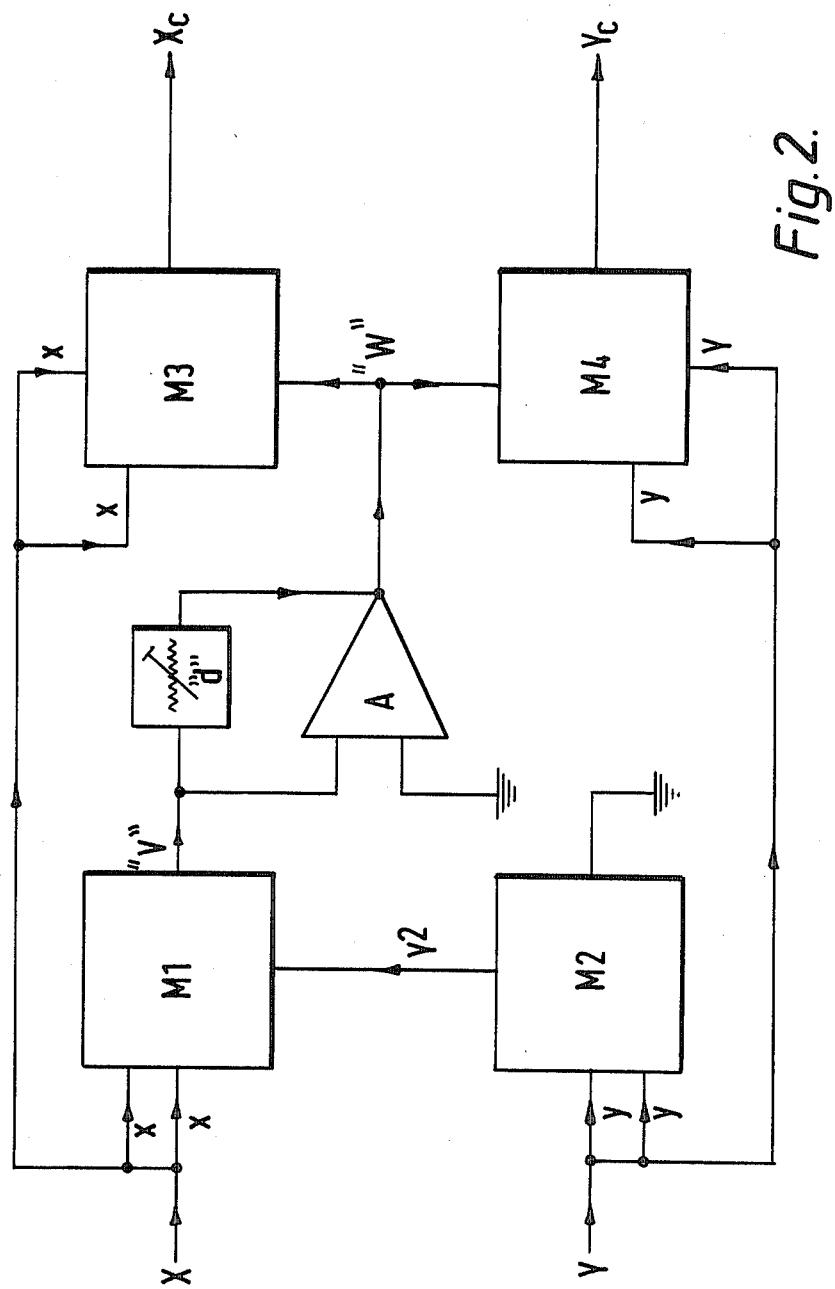

Referring now to FIG. 2 of the drawings the means to pre-distort the image of the display generator comprises an electronic circuit which manipulates the drive voltages to the CRT raster (not shown). The distortion is obtained by using an X and Y co-ordinate system, although other co-ordinate systems such as polar co-ordinates could be used. The XY co-ordinate is used to identify and distort the raster image point at any given instant in accordance with the following equations:

$$Xc = X - \frac{d}{K}(x^2 + y^2), \text{ where } x = X\left[\frac{1 - d(x^2 + y^2)}{K}\right] \quad (1)$$

and $$Yc = Y - \frac{d}{K}(x^2 + y^2), \text{ where } y = Y\left[\frac{1 - d(x^2 + y^2)}{K}\right] \quad (2)$$

where Xc and Yc are the respective corrected voltages required to give pre-distortion, K is a constant and d is the distortion factor required.

The above formulae are suitable for generating barrel distortion but if pin-cushion distortion is required it is simIly necessary to change the appropriate negative sign in each formula to a positive sign.

The compensation circuit shown in FIG. 2 essentially comprises 4 multipliers, marked M1, M2, M3 and M4 respectively, an amplifier marked A and a distortion adjuster marked "d". The circuit is arranged to multiply two drive voltages marked X and Y respectively and distort each voltage by an appropriate amount marked Xc and Yc respectively. Distorted voltages Xc and Yc are distorted so as to correspond to the formulae given above. This is achieved in the case of Xc by means of multiplier M1 generating an $X^2$ signal and adding to the signal a $Y^2$ signal. This signal, divided by a constant K (which is the scaling factor for the multiplier M1) and marked "V" is fed to the amplifier A and the distortion adjuster "d" such that the signal, marked "W" is then in the form:

$$\frac{-d(x^2 + y^2)}{K}$$

This signal "W" is then recombined with the original X voltage in multiplier M3 which then derives the required distortion signal Xc which satisfies the equation:

$$Xc = X\left[\frac{1 - d(x^2 + y^2)}{K^2}\right]$$

In a similar manner, the Y voltage signal is adjusted by means of multiplier M2 and M4 to provide eventually the required distortion signal Yc which corresponds to the equation:

$$Yc = Y\left[\frac{1 - d(x^2 + y^2)}{K^2}\right]$$

In the compensation circuit described above, each multiplier M1, M2, M3 and M4 will in practice introduce a scaling factor "K" which can be compensated for by appropriate adjustment of the applied voltages.

Referring now to FIG. 3 of the drawings, in accordance with the second aspect of the invention, there is shown a schematic arrangement including an array of four television cameras, 10, 11, 12 and 13 respectively, which are each mounted on a rigid platform 14 and individually linked to a respective display generator 15, 16 17 and 18, each including a cathode ray tube. The generators 15, 16, 17 and 18 are arranged in an arcuate manner on a support table 19 and on the front of each is a respective biocular magnifying lens 20, 21, 22 and 23, the arrangement being such that each lens is mounted side-by-side to form a more or less continuous display for an observer at "o". Each biocular lens 20, 21, 22 or 23, in this embodiment of the invention, has a 50° field of view, and with respect to its nearest neighbour has a 10° overlap such that the observer at "o" sees an image, which in this example is apparently at a distance of 0.6 meter away, over a very wide field of view covered by the cameras 10, 11, 12 and 13, which field of view in this case is of the order of 170°.

Display generator 16 is shown partly exposed to reveal the position of a CRT 16a. Display generator 17 is shown in section to reveal a CRT 17a and the construction of the respective biocular magnifier 22, which will be seen to include a total of six optical elements.

Each tube of each display generator 15, 16, 17 and 18 is provided with a pre-distorted image from each respective television camera 10, 11, 12 and 13 by means of suitable adjustment to the raster drive voltages, as previously described in FIG. 2, the result being that the distortions introduced by each biocular magnifying lens 20, 21, 22 or 23 are cancelled out and the observer at "o" is able to see a substantially undistorted view of the wide field of view obtained by the four television cameras. Because the apparent distance from the observer of each display is approximately 0.6 meter, the observer when viewing the scene, is substantially unable to discern the overlap between adjacent displays and sees, in effect, a single wide angle view of approximately 170°.

Figure 4:
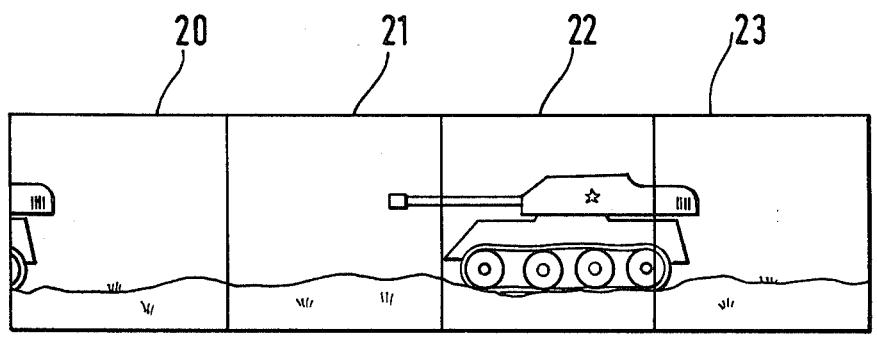
FIG. 4. is a schematic view of the display obtained by the system outlined in FIG. 3.

In FIG. 4 there is shown a typical view of a scene obtained by the display system of FIG. 3, but in which each adjacent picture has been laid flat, for convenience of illustration only. It will be seen that the view is made up of four separately obtained pictures of the surrounding panorama, each picture obtained by a respective camera and displayed by a respective CRT and biocular magnifier 20, 21, 22 and 23. Although in the drawing, the line between each adjacent display is visible, in practice this would not normally be the case and the observer would apparently see a continuous view of the wide field of view even with head movement.

The second aspect of the invention is particularly useful in modern warfare conditions where it is desirable for an observer within, say, a tank, to be able to view a wide field of view at any giving moment, i.e. without having to scan over the required field of view with an observation sight having a conventional relatively narrow field of view. Also, since the viewer is not required to press against the usual brow pad of a conventional sight to see the full field of view, he can remain physically remote from the sighting system in a "relaxed" viewing position. Another advantage is that the observer can remain safely protected by the armour-plating and is not required to be either physically or optically exposed to the field of view, since the cameras can be mounted outboard and the only connection to them is through transmission cabling.

When used in warfare or training roles the display system can be usefully provided with weapon aiming data which can be overlaid on the display, since the minimal resultant distortion achieved by the system can reduce sighting errors.

Any number of modular display units can be used with the system to achieve, for example, 360° viewing of the surrounding panorama.

Instead of one camera being provided for each unit, a single camera having a wide-angle lens could be used to provide pictures to two or more display generators, in which case an electronic frame store could be utilised to build up sequentially a required overall view. Alternatively, there may be a number of cameras, each supplying a respective portion of a picture to a number of respective display generators.

The invention may find particular advantage in retrofit applications where conventional biocular displays can be modified to permit electronic pre-distortion of the respective display generator. This can be easily achieved by simple adjustment of the distortion adjuster "d" in the electronic circuitry which facilitates "tuning" of the system to vary as necessary the required amount of pre-distortion to the display generator. Thus, whilst some optical systems may require a large amount of pre-distortion, other systems may not as the case may be.

Although the invention has been described particularly in connection with biocular optical system, it is equally applicable to, for example, simple magnifying optics designed normally for single-eye viewing.

The electronic control circuitry can advantageously be provided with means to generate a grid pattern of the type shown in FIG. 1 for the purpose of initially "tuning" the display system to relatively easily establish the condition of minimum distortion.

It will be appreciated that although the invention finds particular application in the military field, it can also be used in civilian applications such as surveillance and monitoring situations, for example where a perimeter is to be protected or where an industrial process is to be monitored. Furthermore, it will be appreciated that the invention is not limited to the use of a display generator or generators in the form of a CRT, since developments in flat screen generators, such as Liquid Crystal Displays, make it increasingly likely that such flat screen generators will eventually supercede conventional CRTs as the standard form of display.

I claim:

1. A display system comprising:
    an array of cameras arranged with angularly-spaced orientations to cover a wide field of view;
    a plurality of display generators associated respectively with said cameras, each generator being operable to display an individual image representing a respective part of the field of view, the arrangement of the cameras and the generators being such that the individual images each correspond to a part of the field of view which overlaps with at least one adjacent part of the field of view; and
    an optical system associated with the display generators for viewing the said images simultaneously in an overlapping arrangement to provide a continuous composite image of said wide field of view;
    the display system further comprising electronic control means operable to predistort said individual images corresponding to adjacent parts of the field of view, whereby an observer viewing the composite image is substantially unable to discern any mismatch between the individual images representing adjacent parts of the field of view, even with some head movement.

2. A display system according to claim 1 arranged such that overlapping portions of adjacent displays are relatively large.

3. A display system according to claim 4, wherein each display generator comprises a cathode ray tube, and the optical system includes a plurality of biocular magnifying lenses, and wherein said electronic control means is adapted to compensate for distortion introduced by the optical system such that a substantially undistorted view is obtained over the whole field of view provided by the overlapping individual images.

4. A display system according to claim 3 arranged such that overlapping portions of adjacent displays are relatively large.

5. A display system according to claim 3 arranged such that each respective display generator has an associated magnifier forming part of the optical system, each such generator and magnifier together forming a modular display unit.

6. A display system according to claim 3 arranged such that variable drive voltages are used to identify and distort the raster image point of the generated display in accordance with the following equations:

$$Xc = X - \frac{d}{K}(x^2 + y^2), \text{ where } x = X\left[\frac{1 - d(x^2 + y^2)}{K}\right] \quad (1)$$

and $$Yc = Y - \frac{d}{K}(x^2 + y^2), \text{ where } y = Y\left[\frac{1 - d(x^2 + y^2)}{K}\right] \quad (2)$$

where Xc and Yc are the respective corrected voltages required to give predistortion, K is a constant and d is the distortion factor required.

7. A display system according to claim 6 arranged such that overlapping portions of adjacent displays are relatively large.

8. A display system according to claim 6 arranged such that each respective display generator has an associated magnifier forming part of the optical system, each such generator and magnifier together forming a modular display unit.

* * * * *